United States Patent
Lin et al.

(10) Patent No.: US 11,112,576 B2
(45) Date of Patent: Sep. 7, 2021

(54) OPTICAL LENS AND FABRICATION METHOD THEREOF

(71) Applicant: Rays Optics Inc., Hukou Township, Hsinchu County (TW)

(72) Inventors: Yu-Hsiang Lin, Hukou Township, Hsinchu County (TW); Chen-Cheng Lee, Hukou Township, Hsinchu County (TW); Wei-Chih Hung, Hukou Township, Hsinchu County (TW)

(73) Assignee: Ray Optics Inc., Hsinchu County (TW)

( * ) Notice: Subject to any disclaimer, the term of this patent is extended or adjusted under 35 U.S.C. 154(b) by 108 days.

(21) Appl. No.: 16/215,063

(22) Filed: Dec. 10, 2018

(65) Prior Publication Data

US 2019/0302400 A1  Oct. 3, 2019

(30) Foreign Application Priority Data

Mar. 30, 2018 (TW) .................. 107111283

(51) Int. Cl.
| | |
|---|---|
| *G02B 7/02* | (2021.01) |
| *G02B 9/34* | (2006.01) |
| *G02B 7/10* | (2021.01) |
| *B29D 11/00* | (2006.01) |
| *G02B 27/62* | (2006.01) |

(52) U.S. Cl.
CPC .......... *G02B 7/10* (2013.01); *B29D 11/00009* (2013.01); *G02B 7/023* (2013.01); *G02B 27/62* (2013.01)

(58) Field of Classification Search
CPC ...... G11B 7/0932; G03B 17/14; G02B 13/00; G02B 13/02; G02B 7/021; G02B 7/02; G02B 7/14; G02B 7/023; G02B 7/04; G02B 25/001; G02B 13/16; G02B 21/02; G02B 9/34
USPC ........ 359/827, 811, 819, 813, 821–823, 644, 359/650, 660, 715, 734, 746, 771
See application file for complete search history.

(56) References Cited

U.S. PATENT DOCUMENTS

| | | | | |
|---|---|---|---|---|
| 4,115,505 A | * | 9/1978 | Metabi | G02B 7/04 264/242 |
| 2001/0009071 A1 | | 7/2001 | Iikawa et al. | |
| 2003/0137746 A1 | * | 7/2003 | Kitaoka | G02B 7/028 359/687 |

FOREIGN PATENT DOCUMENTS

| | | |
|---|---|---|
| TW | M246635 | 10/2004 |
| TW | 200630657 | 9/2006 |
| TW | 200815813 A | 4/2008 |

* cited by examiner

*Primary Examiner* — Dawayne Pinkney
(74) *Attorney, Agent, or Firm* — Muncy, Geissler, Olds & Lowe, P.C.

(57) ABSTRACT

One embodiment of the invention provides an optical lens including a first lens group with at least two lenses, a second lens group with at least two lenses, and a parting line located between the first lens group and the second lens group. Each of the lenses of the first and the second lens groups is associated with a respective distance, the respective distance is a distance value measured along an optical axis between two focal points of two end points of an image circle diameter formed at an image plane of the optical lens, under the condition that an optical center of one of the lenses is shifted a distance away from the optical axis. The two lenses with the two largest distance values among all lenses are disposed on the same side of the parting line.

20 Claims, 4 Drawing Sheets

OPTICAL LENS AND FABRICATION METHOD THEREOF

BACKGROUND OF THE INVENTION a. Field of the Invention

The invention relates to an optical lens and a fabrication method of the optical lens.

b. Description of the Related Art

Nowadays, a lens barrel is often formed by injection molding, where a molten material is injected into a mold cavity defined by a top half and a bottom half of a mold and, after the mold closes, solidifies to form a desired molded part. However, in the closing action an imperfect alignment of the top half and the bottom half of the mold may result in centering errors of the molded part. This may cause optical centers of the lenses disposed in the lens barrel to deviate from the optical axis and thus reduce coaxiality among different lenses to adversely affect the optical performance of an optical lens.

BRIEF SUMMARY OF THE INVENTION

In one aspect of the present disclosure, a fabrication method of an optical lens includes disposing a first lens and a second lens in a first lens barrel, disposing a third lens and a fourth lens in a second lens barrel, and assembling the first lens barrel and the second lens barrel. The first lens is associated with a first distance D1, the second lens is associated with a second distance D2, the third lens is associated with a third distance D3, and the fourth lens is associated with a fourth distance D4. Each of the first to fourth distances D1-D4 associated with a respective lens is a distance value measured along an optical axis between two focal points of two end points of an image circle diameter formed at an image plane of the optical lens, under the condition that an optical center of the respective lens is shifted a distance away from the optical axis. The first to fourth distances D1-D4 satisfy the condition of D1>D2>D3>D4. According to the above aspect, since the two lenses with the two largest distance values are disposed in the same lens barrel, the coaxiality between the two most sensitive lenses are well controlled to improve the optical performance and production yield.

In another aspect of the present disclosure, a fabrication method of an optical lens includes disposing a first lens group having at least two lenses on a first side of a lens barrel, and disposing a second lens group having at least two lenses on a second side of the lens barrel. Each of the lenses of the first lens group is associated with a respective distance, and each of the lenses of the second lens group is associated with a respective distance. The respective distance is a distance value measured along an optical axis between two focal points of two end points of an image circle diameter formed at an image plane of the optical lens, under the condition that an optical center of one of the lenses is shifted a distance away from the optical axis. A parting line is located between the first lens group and the second lens group, and two lenses with the two largest distance values among all lenses of the optical lens are disposed on the same side of the parting line. According to the above aspect, since the two lenses with the two largest distance values are disposed on the same side of a parting line, the adverse influence over the optical performance due to the centering errors can be reduced to improve the optical performance and production yield.

In another aspect of the present disclosure, an optical lens includes a first lens group having at least two lenses, a second lens group having at least two lenses, and a parting line located between the first lens group and the second lens group. Each of the lenses of the first and the second lens groups is associated with a respective distance, the respective distance is a distance value measured along an optical axis between two focal points of two end points of an image circle diameter formed at an image plane of the optical lens, under the condition that an optical center of one of the lenses is shifted a distance away from the optical axis. The two lenses with the two largest distance values among all lenses of the optical lens are disposed on the same side of the parting line. According to the above aspect, each lens is analyzed to identify its sensitivity to the centering errors (such as by obtaining the unbalance value of each lens), and the position of a parting line between two lens barrels or two parts of one lens barrel is determined according to the analysis results. For example, two lenses having the largest and the next largest unbalance among these lenses are disposed on the same side of the parting line to well control the coaxiality between the two most sensitive lenses. Further, the unbalance value of the two most sensitive lens disposed on the same side of the parting line may cancel each other out to reduce the overall unbalance of the optical lens formed by mold closing or mechanical coupling, so that the adverse influence over the optical performance due to the centering errors can be reduced to improve the optical performance and production yield.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etcetera, is used with reference to the orientation of the Figure(s) being described. The components of the invention can be positioned in a number of different orientations. As such, the directional terminology is used for purposes of illustration and is in no way limiting. Further, "First," "Second," etcetera, as used herein, are used as labels for nouns that they precede, and do not imply any type of ordering (e.g., spatial, temporal, logical, etcetera).

Figure 1:
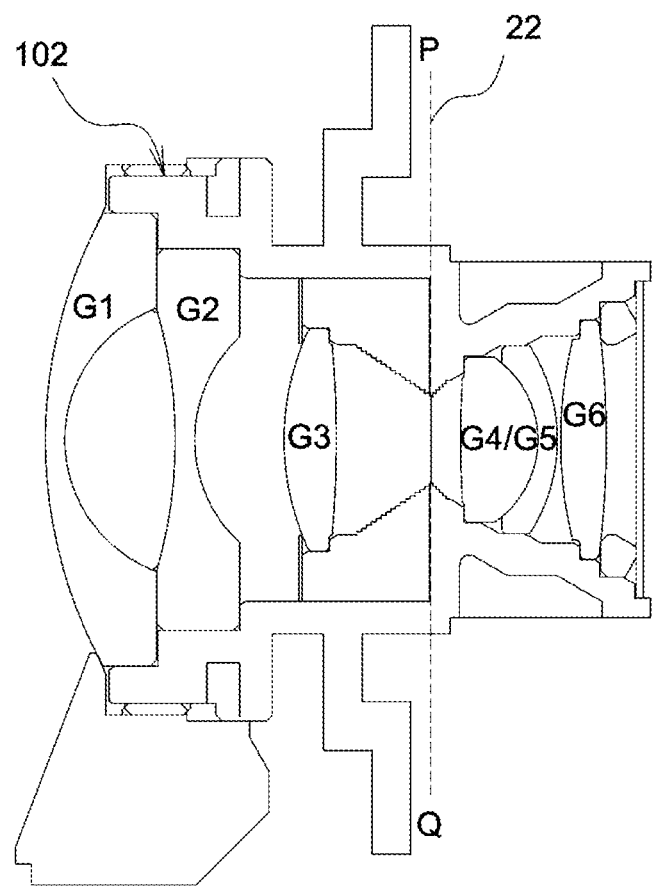
FIG. 1 shows a schematic cross-section of an optical lens.

As shown in FIG. 1, an optical lens 100 includes a lens barrel 102 and lenses G1-G6 disposed in the lens barrel 102. The lenses G1-G3 are located on the left side of a parting line 22, and a cemented lens (including the lenses G4 and G5) and the lens G6 are located on the right side of the parting line 22. Typically, a parting line is defined at the juncture of respective halves of a mold. FIG. 1 schematically depicts the parting line 22 as a connecting line of points P and Q, and, in this embodiment, the parting line 22 is coincidence with the narrowest portion of the mold (and hence the narrowest portion of a lens barrel).

Figure 2:
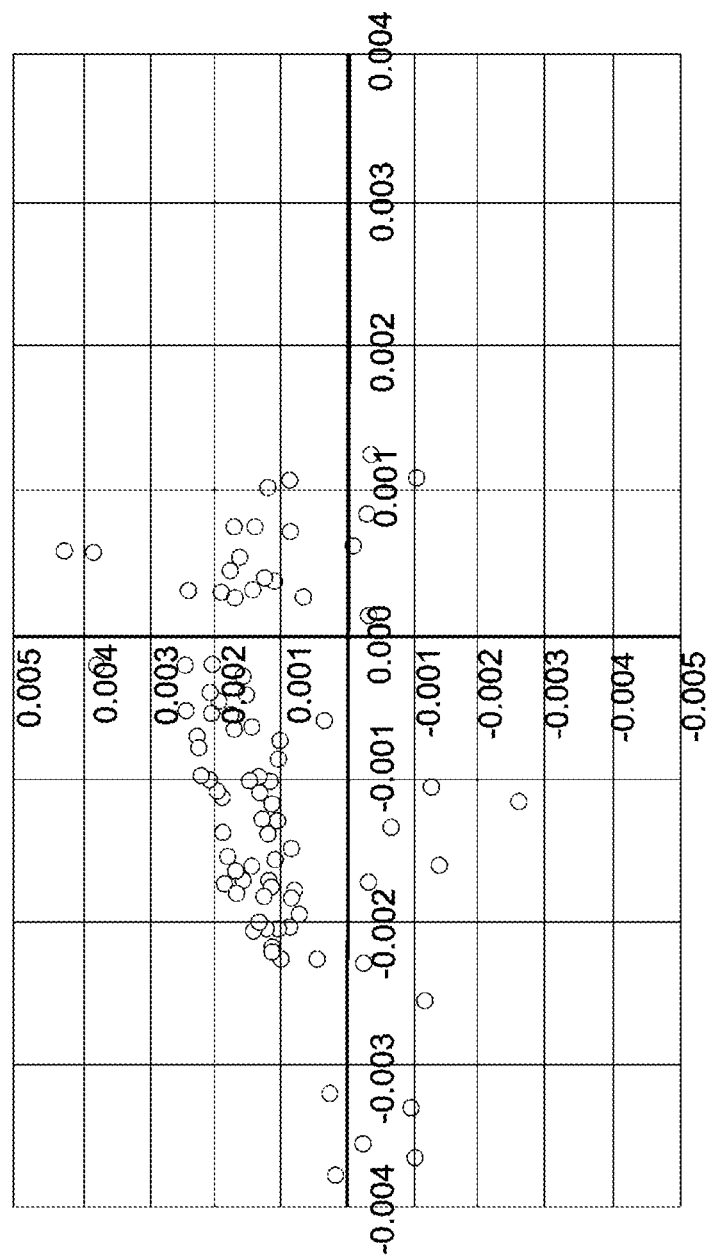
FIG. 2 shows variations in the coaxiality between different lenses in a lens barrel, where different samples are continuously formed by the same mold at different time instances.

FIG. 2 shows variations in the coaxiality between the lens G3 and the lens G5 in the lens barrel 102 of FIG. 1, where different samples of the optical lens shown in FIG. 2 are continuously formed by the same mold at different time instances. In FIG. 2, the optical center of the lens G5 on the right side of the parting line 22 is given coordinates (0,0), and multiple circular points shown in FIG. 2 indicate optical centers of different samples of the optical lens G3 on the left side of the parting line 22 deviating from the optical center of the lens G5. As illustrated in FIG. 2, the apparent variations in the coaxiality between the lens G3 and the lens G5 in the continuous formation process of the same mold cause considerable centering errors, therefore adversely affecting the optical performance of the optical lens. Moreover, the same centering errors may cause different degrees of adverse influence over the optical performance for respective lenses. Therefore, in case two highly-sensitive lenses whose optical performance is apparently influenced by the centering errors are respectively disposed on two sides of the parting line, the centering errors due to mold closing may be worsened to further deteriorate the optical performance and thus reduce production yield.

Figure 3:
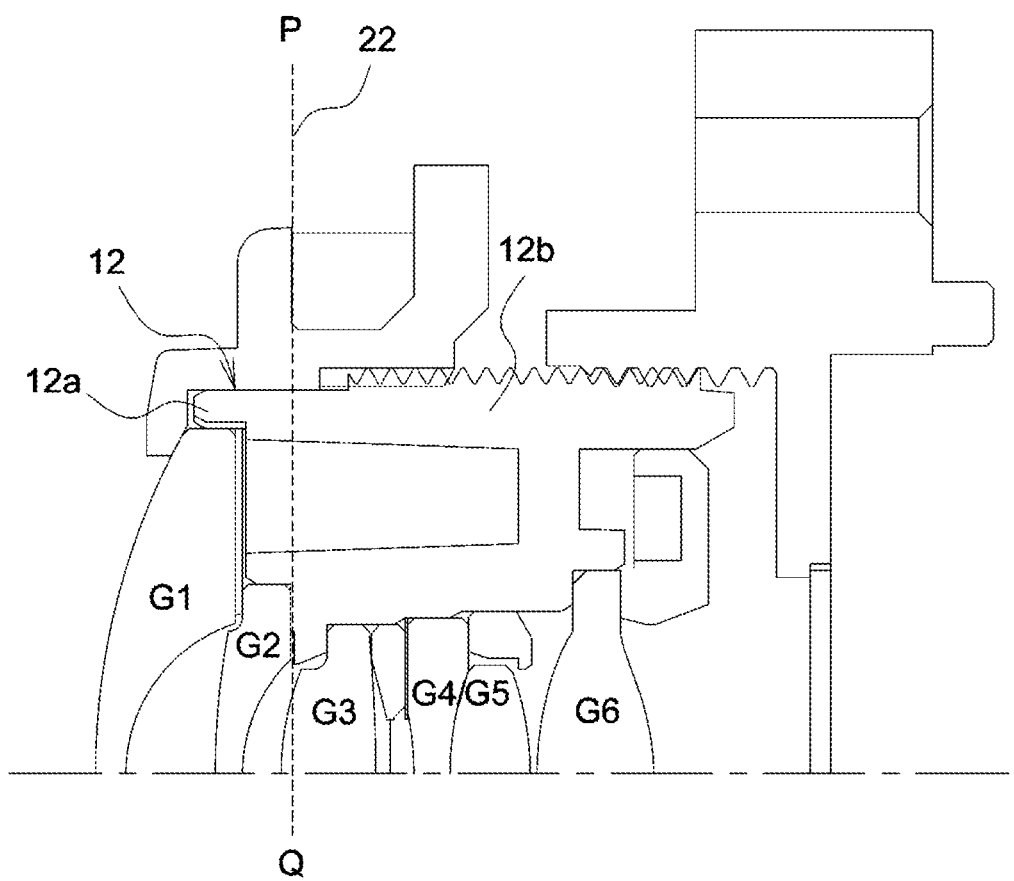
FIG. 3 shows a schematic cross-section of an optical lens according to an embodiment of the invention.

FIG. 3 shows a schematic diagram of an optical lens 10 according to an embodiment of the invention. Referring to FIG. 3, the optical lens 10 includes a lens barrel 12, and a first lens group and a second lens group disposed in the lens barrel 12. In this embodiment, the first lens group (lenses G1 and G2) is disposed on the left side of the lens barrel 12, the second lens group (lenses G3-G6) is disposed on the right side of the lens barrel 12, and a parting line 22 is located between the first lens group (lenses G1 and G2) and the second lens group (lenses G3-G6). In this embodiment, the lens barrel 12 may include a first part 12a and a second part 12b that join at the parting line 22 through mold closing, the first lens group (lenses G1 and G2) is disposed in the first part 12a, and the second lens group (lenses G3-G6) is disposed in the second part 12b. The centering errors due to mold closing may cause optical centers of the lenses disposed in the lens barrel 12 to deviate from the optical axis to a certain extent. Therefore, the lenses G1 and G2 disposed in the first part 12a of the molded lens barrel 12 is liable to be off-centered relative to the lenses G3-G6 disposed in the second part 12b of the molded lens barrel 12 to adversely affect the performance of an optical lens. Moreover, the same centering errors may cause different degrees of adverse influence over the optical performance of respective lenses. In one embodiment, the value of unbalance (UB) may indicate the degree that the optical performance of an individual lens is influenced. Specifically, a lens associated with a larger absolute value of unbalance (UB) may indicate that the centering errors adversely affect the optical performance of that lens to a greater extent. Table 1 lists various unbalance values of respective lenses G1-G6 of the optical lens measured at different positions of an image circle, where the unbalance values of any one of the lenses G1-G6 is measured under the condition that an optical center of that lens is shifted a distance of 5 um away from the optical axis. As shown in Table 1 below, each lens has its own unbalance values. In this embodiment, under the condition that an optical center of the lens is shifted a distance away from the optical axis, a diameter of an image circle formed at the image plane of the optical lens has two end points F and −F, the end point F corresponds to a first focus point (clearest image point) on the optical axis, the end point −F correspond to a second focus point (clearest image point) on the optical axis, and a distance measured along the optical axis between the first focal point and the second focal point is defined as the maximum unbalance value.

TABLE 1

| Offset distance: 5 um; Spatial frequency: 63 lp/mm; Image height: F = 2.8 mm | | | | | | |
|---|---|---|---|---|---|---|
| | unbalance value (um) | | | | | |
| Position | center | ±0.2F | ±0.4F | ±0.6F | ±0.8F | ±1.0F |
| G1 | 0 | 1 | 2 | 2 | 2 | 3 |
| G2 | 0 | 0 | 0 | 0 | −1 | −4 |
| G3 | 0 | 4 | 8 | 14 | 19 | 34 |
| G4/G5 (cemented) | 0 | −2 | −4 | −4 | −7 | −7 |
| G6 | 0 | −4 | −6 | −11 | −15 | −23 |

Figure 4:
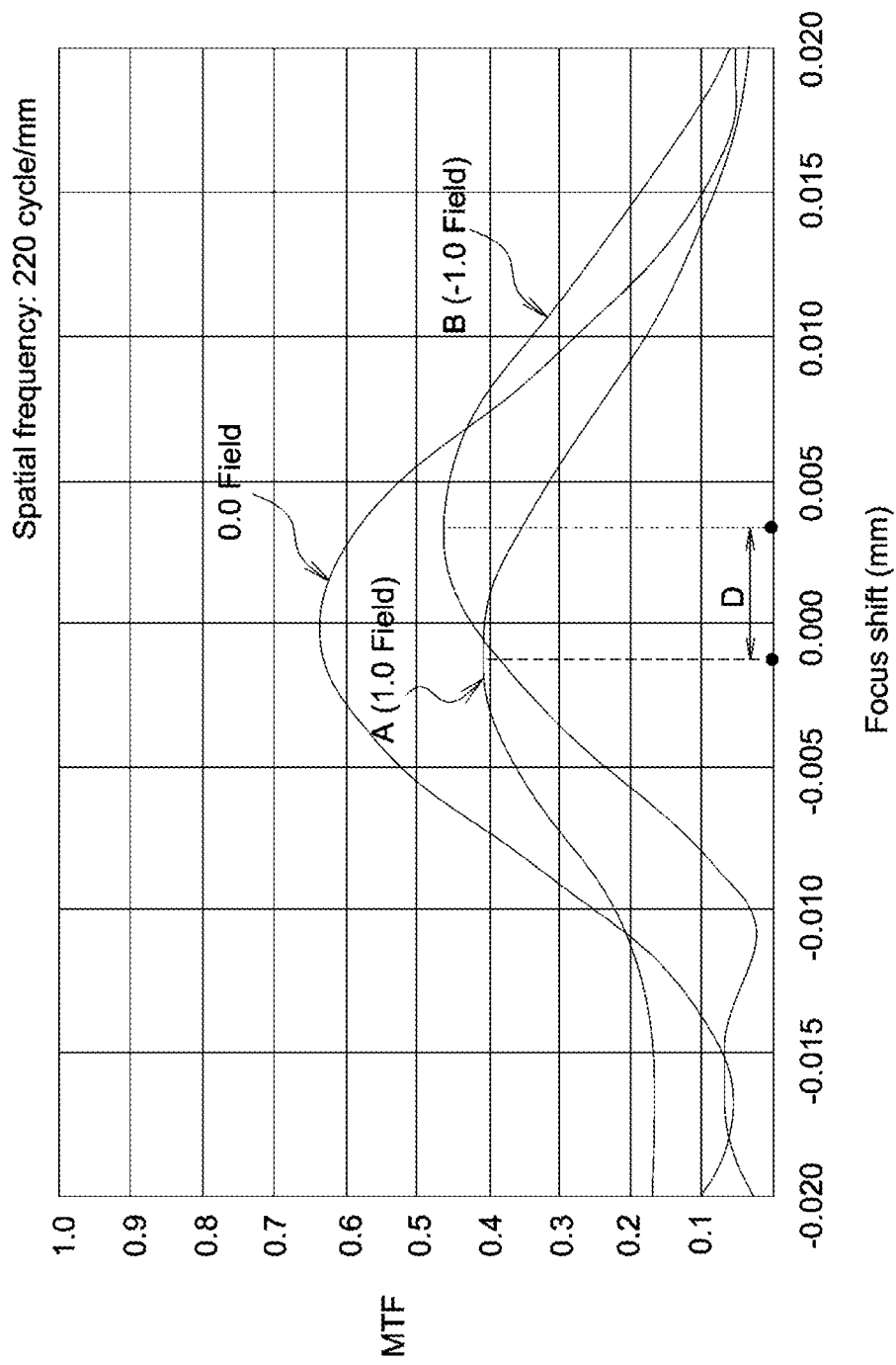
FIG. 4 shows MTF curves illustrating an example for measuring a maximum unbalance value.

FIG. 4 illustrates an example for measuring a maximum unbalance value. As shown in FIG. 4, the end point F described above corresponds to an MTF curve A (1.0 Field), the end point −F described above corresponds to another MTF curve B (−1.0 Field), the MTF curve A (1.0 Field) has a first apex, the MTF curve B (−1.0 Field) has a second apex, and, as indicated in FIG. 4, a distance D of focus shift between the first apex and the second apex can be referred to as an absolute value of the maximum unbalance value. For example, the maximum unbalance value of the lens G3 is 34 um, and the maximum unbalance value of the lens G6 is −23 um.

Referring to Table 1 again, under the same offset distance of 5 um, the lenses G3 and G6 have larger unbalance as compared with other lenses; that is, the lenses G3 has the largest absolute value of the maximum unbalance value (largest value of the distance D), and the lens G6 has the next largest absolute value of the maximum unbalance value (next largest value of the distance D). Therefore, the lenses G3 and G6 are the two most sensitive lenses whose optical performance is apparently affected by centering errors. Under the circumstance, when the two most sensitive lenses G3 and G6 are disposed on two opposite sides of the parting line 22, the centering errors may considerably worsen the optical performance to reduce production yield.

Therefore, in one embodiment, because the two most sensitive lenses G3 and G6 (having the largest and the next largest values of the distance D) are disposed on the same side of the parting line 22 (such as the right side), the coaxiality between the two most sensitive lenses G3 and G6 can be well controlled without being influenced by the centering errors. Further, as shown in Table 1, the unbalance values of the lens G3 are positive, and the unbalance values of the lens G6 are negative. Therefore, when the lens G3 and the lens G6 are disposed on the same side of the parting line 22, their unbalance values may cancel each other out to reduce the overall unbalance of the optical lens.

In other embodiment, the first lens group having at least two lenses may be disposed in a first lens barrel, the second lens group having at least two lenses may be disposed in a second lens barrel, and the first lens barrel and the second lens barrel may be combined by mold closing or assembled by mechanical coupling.

According to the above embodiments, each lens is analyzed to identify its sensitivity to the centering errors (such as by obtaining unbalance values of each lens), and the position of a parting line between two lens barrels or two parts of one lens barrel is determined according to the analysis results. For example, two lenses having the largest and the next largest unbalance (such as by comparing their maximum absolute values) among these lenses are disposed on the same side of the parting line to well control the coaxiality between the two most sensitive lenses. Further, the unbalance value of the two most sensitive lens disposed on the same side of the parting line may cancel each other out to reduce the overall unbalance of the optical lens formed by mold closing or mechanical coupling, so that the adverse influence over the optical performance due to the centering errors can be reduced to improve the optical performance and production yield.

The material of each lens described in the above embodiment may include, but is not limited to, glass or plastic. Further, the parting line is not limited to a specific position and may vary according to actual demands, as long as the two most sensitive lenses (such as having the largest and the next largest unbalance or the distance D) are disposed on the same side of the parting line. For example, in the embodiment shown in FIG. 3, the two lenses with two largest unbalance are the lens G3 and the lens G6, and thus the parting line may lie between the lens G2 and the lens G3, and the lens closest to the parting line as compared with any other lens of the optical lens is one of the two most sensitive lenses (lens G3 in this embodiment), but the invention is not limited thereto.

According to the design of the above embodiments, a fabrication method of an optical lens is disclosed. The fabrication method includes disposing a first lens and a second lens in a first lens barrel, disposing a third lens and a fourth lens in a second lens barrel, and assembling the first lens barrel and the second lens barrel. The first lens is associated with a first distance D1 (the unbalance value of the first lens), the second lens is associated with a second distance D2 (the unbalance value of the second lens), the third lens is associated with a third distance D3 (the unbalance value of the third lens), and the fourth lens is associated with a fourth distance D4 (the unbalance value of the fourth lens). Each of the first to fourth distances D1-D4 associated with a respective lens is a distance value measured along an optical axis between two focal points of two end points of an image circle diameter formed at an image plane of the optical lens, under the condition that an optical center of the respective lens is shifted a distance away from the optical axis. The first to the fourth distances D1-D4 satisfy the condition of D1>D2>D3>D4.

According to the design of the above embodiments, another fabrication method of an optical lens is disclosed. The fabrication method includes disposing a first lens group having at least two lenses on a first side of a lens barrel, and disposing a second lens group having at least two lenses on a second side of the lens barrel. Each of the lenses of the first lens group and the second lens group is associated with a respective distance. The respective distance is a distance value measured along an optical axis between two focal points of two end points of an image circle diameter formed at an image plane of the optical lens, under the condition that an optical center of one of the lenses is shifted a distance away from the optical axis. A parting line is located between the first lens group and the second lens group, and two lenses with the two largest distance values among all lenses of the optical lens are disposed on the same side of the parting line.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the power transmission may be achieved by direct contact, indirect contact (via rigid or non-rigid intermediate objects) or actions at a distance (such as a magnetic force). Further, a connection between two elements is not limited to a direct direction and may be alternatively realized by the use of an intermediate object, such as a movable mechanical element, a controlling mechanical element, or a connection mechanical element, without influencing the power transmission. Therefore, unless limited otherwise, the terms "connected," "coupled," and "mounted" and variations thereof herein are used broadly and encompass direct and indirect connections, couplings, and mountings. It is intended that the scope of the invention be defined by the claims appended hereto and their equivalents in which all terms are meant in their broadest reasonable sense unless otherwise indicated.

What is claimed is:

1. A fabrication method of an optical lens, comprising:
    disposing a first lens and a second lens in a first lens barrel, the first lens being associated with a first maximum unbalance value, and the second lens being associated with a second maximum unbalance value;
    disposing a third lens and a fourth lens in a second lens barrel, the third lens being associated with a third maximum unbalance value, and the fourth lens being associated with a fourth maximum unbalance value, wherein the first to the fourth maximum unbalance values are relied on to determine how imaging performance of the optical lens is influenced when one of the lenses is off-center for a certain degree, and each of the first to fourth maximum unbalance values associated with a respective lens is a measured along an optical axis between two focal points of two end points of an image circle diameter formed at an image plane of the optical lens, under the condition that an optical center of the respective lens is shifted a distance away from the optical axis; and
    assembling the first lens barrel and the second lens barrel, wherein an absolute value of the first maximum unbalance value is larger than an absolute value of the second maximum unbalance value, the absolute value of the second maximum unbalance value is larger than an absolute value of the third maximum unbalance value, and the absolute value of third maximum unbalance value is larger than an absolute value of the fourth maximum unbalance value.

2. The fabrication method as claimed in claim 1, wherein the first lens barrel and the second lens barrel are combined by mold closing.

3. The fabrication method as claimed in claim 1, wherein the first lens barrel and the second lens barrel are assembled by mechanical coupling.

4. The fabrication method as claimed in claim 1, wherein one of the two lenses with the two largest absolute values of maximum unbalance values has a positive unbalance value, and the other one of the two lenses has a negative unbalance value.

5. The fabrication method as claimed in claim 1, wherein each of the lenses is formed from glass or plastic.

6. The fabrication method as claimed in claim 1, wherein one of the two lenses with the two largest absolute values of maximum unbalance values is closest to a parting line as compared with any other lens of the optical lens.

7. A fabrication method of an optical lens, comprising:
disposing a first lens group having at least two lenses on a first side of a lens barrel, each of the lenses of the first lens group being associated with a respective maximum unbalance value; and
disposing a second lens group having at least two lenses on a second side of the lens barrel, each of the lenses of the second lens group being associated with a respective maximum unbalance value, each of the maximum unbalance values being relied on to determine how imaging performance of the optical lens is influenced when one of the lenses is off-center for a certain degree and being measured along an optical axis between two focal points of two end points of an image circle diameter formed at an image plane of the optical lens, under the condition that an optical center of one of the lenses is shifted a distance away from the optical axis, a parting line being located between the first lens group and the second lens group, and two lenses with the two largest absolute values of maximum unbalance values among all lenses of the optical lens being disposed on the same side of the parting line.

8. The fabrication method as claimed in claim 7, wherein one of the two lenses with the two largest absolute values of maximum unbalance values has a positive unbalance value, and the other one of the two lenses has a negative unbalance value.

9. The fabrication method as claimed in claim 7, wherein each of the lenses is formed from glass or plastic.

10. The fabrication method as claimed in claim 7, wherein one of the two lenses with the two largest absolute values of maximum unbalance values is closest to the parting line as compared with any other lens of the optical lens.

11. The fabrication method as claimed in claim 7, wherein the lens barrel has a first part and a second part that are joined by mold closing at the parting line, the first lens group is disposed in the first part, and the second lens group is disposed in the second part.

12. An optical lens, comprising:
a first lens group having at least two lenses respectively associated with a first maximum unbalance value and a second maximum unbalance value;
a second lens group having at least two lenses respectively associated with a third maximum unbalance value and a fourth maximum unbalance value, wherein the first, the second, the third and the fourth maximum unbalance values are relied on to determine how imaging performance of the optical lens is influenced when one of the lenses is off-center for a certain degree; and
a parting line located between the first lens group and the second lens group, each of the first, the second, the third and the fourth maximum unbalance values being measured along an optical axis between two focal points of two end points of an image circle diameter formed at an image plane of the optical lens, under the condition that an optical center of one of the lenses is shifted a distance away from the optical axis, and two lenses with the two largest absolute values of maximum unbalance values among all lenses of the optical lens are disposed on the same side of the parting line.

13. The optical lens as claimed in claim 12, wherein the first lens group is disposed in a first lens barrel, and the second lens group is disposed in a second lens barrel.

14. The optical lens as claimed in claim 13, wherein the first lens barrel and the second lens barrel are combined by mold closing.

15. The optical lens as claimed in claim 13, wherein the first lens barrel and the second lens barrel are assembled by mechanical coupling.

16. The optical lens as claimed in claim 12, wherein the first lens group is disposed in a first part of a lens barrel, the second lens group is disposed in a second part of the lens barrel, and the first part and a second part are joined by mold closing at the parting line.

17. The optical lens as claimed in claim 16, wherein the parting line is coincidence with the narrowest portion of the lens barrel.

18. The optical lens as claimed in claim 12, wherein one of the two lenses with the two largest absolute values of maximum unbalance values has a positive unbalance value, and the other one of the two lenses has a negative unbalance value.

19. The optical lens as claimed in claim 12, wherein each of the lenses is formed from glass or plastic.

20. The optical lens as claimed in claim 12, wherein one of the two lenses with the two largest absolute values of maximum unbalance values is closest to the parting line as compared with any other lens of the optical lens.

* * * * *